United States Patent
Cloutier et al.

(10) Patent No.: US 6,366,191 B1
(45) Date of Patent: Apr. 2, 2002

(54) METHOD AND APPARATUS FOR PROVIDING PERMANENT MAGNETIC SIGNATURES IN BURIED CABLES AND PIPES TO FACILITATE LONG-RANGE LOCATION, TRACKING AND BURIAL DEPTH DETERMINATION

(75) Inventors: Paul A. Cloutier, Nassau Bay; Timothy I. Marzolf, Tomball; Delbert R. Oehme, Bryan; Ronald F. Stebbings, Houston, all of TX (US)

(73) Assignee: Innovatum, Inc., Houston, TX (US)

( * ) Notice: Subject to any disclaimer, the term of this patent is extended or adjusted under 35 U.S.C. 154(b) by 0 days.

(21) Appl. No.: 09/594,146

(22) Filed: Jun. 15, 2000

Related U.S. Application Data

(62) Division of application No. 09/292,002, filed on Apr. 15, 1999.
(60) Provisional application No. 60/082,469, filed on Apr. 20, 1998.

(51) Int. Cl.[7] .................................. H01F 7/02
(52) U.S. Cl. ...................................... 335/302
(58) Field of Search ................. 335/284, 285, 335/296–306; 385/100–114

(56) References Cited

U.S. PATENT DOCUMENTS

| | | | |
|---|---|---|---|
| 3,452,343 A | * 6/1969 | Crank et al. .................. 360/89 |
| RE29,165 E | * 3/1977 | Bode .......................... 310/46 |
| 4,427,943 A | 1/1984 | Cloutier et al. .............. 324/326 |
| 4,465,140 A | 8/1984 | Hoehn, Jr. ................... 166/381 |
| 4,749,978 A | * 6/1988 | Imamura et al. ............. 335/284 |
| 5,051,034 A | 9/1991 | Goodman ..................... 405/157 |
| 5,096,763 A | * 3/1992 | Ogata et al. ................... 428/76 |
| 5,114,517 A | 5/1992 | Rippingale et al. .......... 156/187 |
| 5,122,750 A | 6/1992 | Rippingale et al. .......... 324/326 |
| RE34,701 E | 8/1994 | Goodman ..................... 156/244 |
| 5,354,521 A | 10/1994 | Goodman ...................... 264/24 |

* cited by examiner

*Primary Examiner*—Ramon M. Barrera
(74) *Attorney, Agent, or Firm*—Miles & Stockbridge P.C.

(57) ABSTRACT

Ferromagnetic material of an elongated object, such as a fiber optic cable, is permanently magnetized in a manner that results in a substantially cylindrically symmetric radial external magnetic field around the object. The produced magnetization is substantially greater than natural magnetization of the ferromagnetic material by the earth's magnetic field. The radial external magnetic field varies periodically along the length of the object. If the wavelength of the periodic variations is long compared to the width (diameter) of the object, the strength of the radial external magnetic field decreases approximately inversely with distance from the object for distances that are small compared to the wavelength. The periodic magnetic field variations may have a square wave or a sine wave pattern, for example. Magnetization of the ferromagnetic material is achieved by a magnetizer having pairs of counter-rotating mirror-image magnets adjacent to an object that is moved longitudinally relative to the magnets. By virtue of the magnetization, buried objects, such as pipes and cables can be detected magnetically at substantial distances from the objects.

12 Claims, 10 Drawing Sheets

(LONGITUDINAL SCALE GREATLY COMPRESSED)

METHOD AND APPARATUS FOR PROVIDING PERMANENT MAGNETIC SIGNATURES IN BURIED CABLES AND PIPES TO FACILITATE LONG-RANGE LOCATION, TRACKING AND BURIAL DEPTH DETERMINATION

CROSS-REFERENCE TO RELATED APPLICATION

This application is a division of application Ser. No. 09/292,002 filed Apr. 15, 1999.

This application claims the benefit of Provisional Application Ser. No. 60/082,469 filed Apr. 20, 1998, incorporated herein by reference.

BACKGROUND OF THE INVENTION

This invention is concerned with magnetization of ferromagnetic material in elongated objects such as fiber optic cables and is more particularly concerned with providing cables and pipes with permanent magnetic signatures to facilitate their detection magnetically.

Many types of buried pipelines and power and communication cables are either fabricated of ferromagnetic material or employ ferromagnetic material as strength or armor members, making them susceptible to detection magnetically. Larger pipes and cables may, to a certain extent, be detectable magnetically by virtue of their natural magnetization (e.g., due to the earth's magnetic field), but smaller pipes and cables are more difficult to detect magnetically.

Submarine fiber optic communication cables, which are strung by ships across the oceans of the world, must be buried beneath the seabed for protection from sea life, anchors, and trawls, but subsequently they must be located for repairs or maintenance. Conventional means of locating, tracking and determining burial depth of unpowered buried fiber optic communications cables magnetically are limited in capability. Smaller cables in current use are difficult to detect by passive magnetization techniques at slant ranges greater than roughly 0.8 meters. Nevertheless, projected world-wide expansion of the subsea fiber optic communications networks will result in a greater proportion of small cables which are the most difficult to detect.

BRIEF DESCRIPTION OF THE INVENTION

The present invention provides fiber optic cables, and other elongated objects comprising ferromagnetic material, with enhanced permanent magnetic signatures which allow detection, location, tracking and burial depth determination of the objects at unprecedented slant ranges. The invention involves unique methods and apparatus for producing magnetization in ferromagnetic material of elongated objects and provides the objects with strong distinctive magnetic signatures. The invention will be described in its application to fiber optic communications cables, such as those employed in subsea fiber optic communications networks, but it will be apparent that the invention is not limited to such applications and may be employed, more generally, with regard to cables, pipes, or other elongated objects comprising ferromagnetic material.

Magnetization of unpowered fiber optic cables in accordance with the invention can be achieved during the cable laying process, or during the manufacture of the cables, for example, and does not require changes in cable construction or the laying process itself, nor does it interfere in any way with the operation of the fiber optic cable or cause mechanical stress or damage to the cable.

Submarine fiber optic communications cables typically have an optic fiber surrounded by a steel wire strength rope or steel armor. It is known that such cables may have unintended natural magnetization resulting from local magnetic fields (primarily the earth's field) captured at the time of fabrication, but such naturally occurring magnetization of both armored and unarmored cables is generally far less than the saturation field level of the ferromagnetic materials in the cable and is not easily detected. Moreover, the external magnetic fields resulting from naturally-occurring magnetization tend to follow the helical arrangement of the armor or wire ropes and are not uniformly radial or cylindrically symmetric. Passive magnetic detection of the external fields is quite limited. For example, with available detection equipment, burial depth measurement is limited to about 0.9 to 1.2 meters on 40 mm cable, and to about 0.5 to 0.8 meter on 10 mm cable. Continuous tracking and burial depth measurements are made difficult by variations in magnetic field strength along the cables associated with the pitch length of armor or wire ropes.

The present invention produces magnetic fields near saturation in ferromagnetic material of fiber optical cables, or other elongated objects, including permanent remnant magnetization. The produced magnetization is much stronger than any natural magnetization of the ferromagnetic material by the earth's magnetic field. An axial gradient in the applied axial (longitudinal) magnetization produces a radial external "leakage" magnetic field around the cable that is substantially cylindrically symmetric and that varies periodically along the length of the cable, providing a strong permanent magnetic signature that can be readily detected by passive magnetic detection methods. The periodic variations in the radial external magnetic field along the cable may have a square wave or a sine wave pattern, for example. If the wavelength of the variations is long enough, the external field strength over most of the cable decreases approximately linearly with distance from the cable.

The desired magnetization can be achieved by the use of a unique magnetizer having a pair of mirror-image magnets (or a plurality of pairs) disposed at opposite sides of the cable, for producing a strong magnetic field adjacent to the cable, which varies repetitively as the cable is moved longitudinally relative to the magnets.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
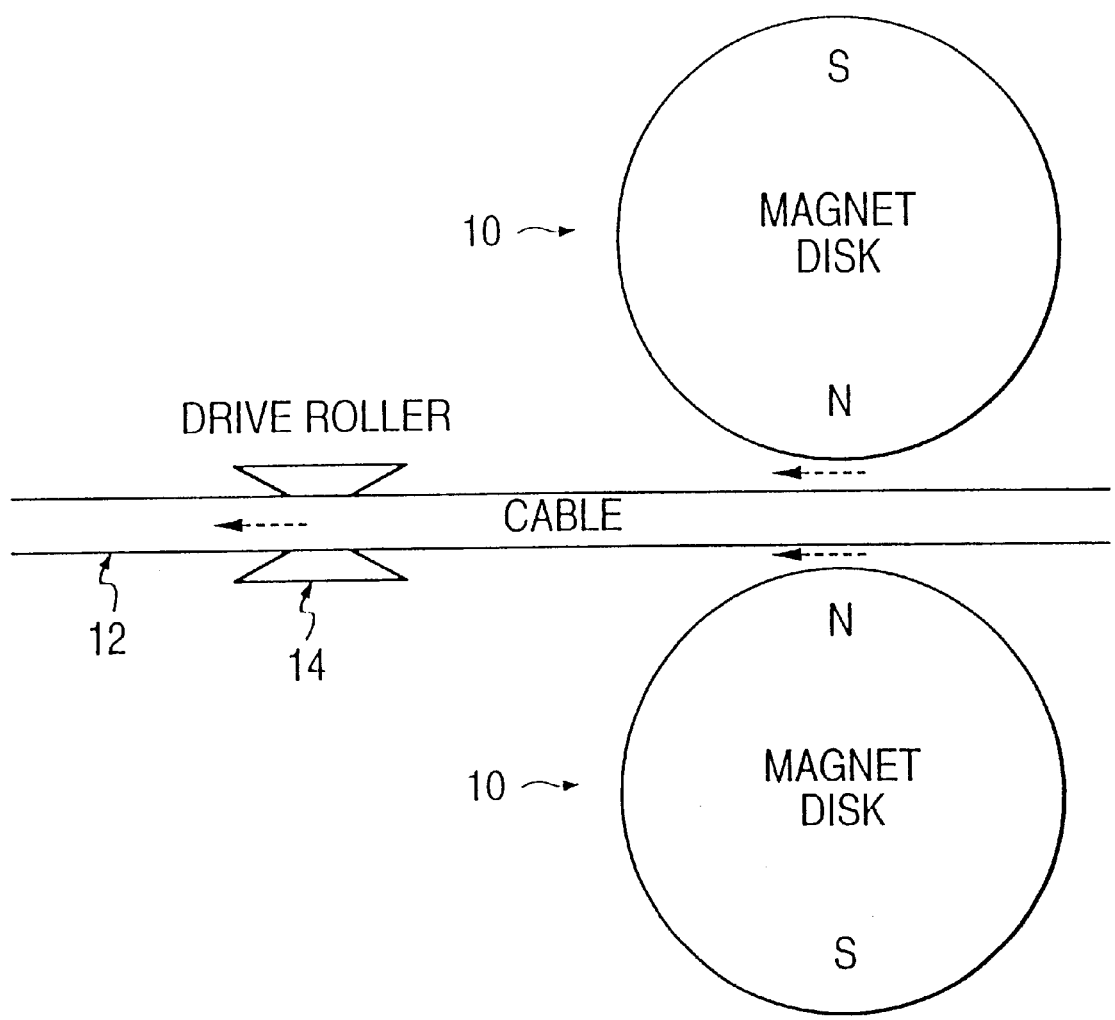
FIG. 1 is the diagrammatic plan view showing a first embodiment of a magnetizer in accordance with the invention.

FIG. 1 shows, diagrammatically, a simple apparatus for producing desired magnetization of a fiber optic cable. The apparatus comprises a magnetizer that includes a pair of strong mirror-image magnets (e.g., rare earth magnets with pole strengths of about 20 K Gauss) supported on counter-rotating non-magnetic disks 10 (of aluminum or plastic, for example). Each magnet may be a long permanent bar magnet extending across a disk or shorter bar magnets oppositely mounted adjacent to the periphery of the disk and joined by a length of highly permeable magnetic material.

The cable 12 is driven longitudinally by a suitable tractor drive (not shown), for example, and the disks are disposed close to opposite sides of the cable. Each disk is supported for rotation about an axis perpendicular to the plane of the figure. The rotation of the disks is synchronized so that, while the strength of the magnetic field adjacent to the cable varies with disk rotation, the polarity of the field at one side of the cable is the same as the polarity of the field at the opposite side. A drive mechanism for rotating the disks includes a drive roller 14 driven by the longitudinal movement of the cable and linkages (not shown) connecting the drive roller and the disks. Suitable linkages will be described later.

The applied magnetic field in ferromagnetic material of the cable is near saturation and is much stronger than any natural magnetization (due to the earth's magnetic field, for example), so that it overwrites or erases the natural magnetization throughout the length of the cable (except perhaps at regions of applied field polarity transitions).

The arrangement shown in FIG. 1 produces a repetitive sinusoidal gradient in the cable magnetization and a sinusoidal variation in the radial external magnetic field. Other external magnetic field patterns can be produced by using magnets with various spacings, orientations, and pole strengths around the disk circumference. For example, the magnetizer shown in FIG. 2 comprises a pair of counter-rotating disks 10A of non-magnetic material supporting a plurality of pairs of magnets arranged diametrally, as shown. This arrangement produces repetitive square wave variations in the radial external magnetic field.

Figure 2:
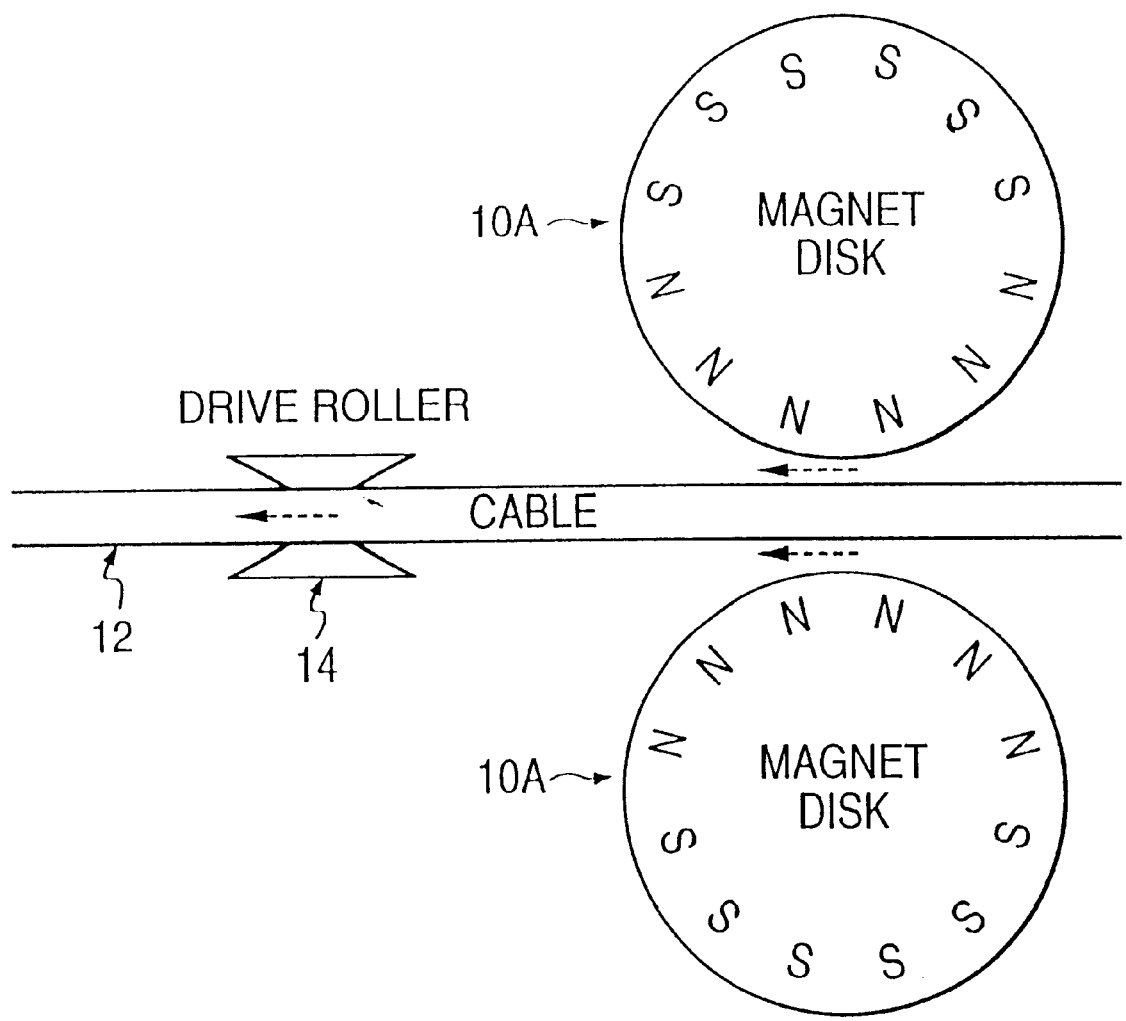
FIG. 2 is a similar view of a second embodiment.
Figure 3:
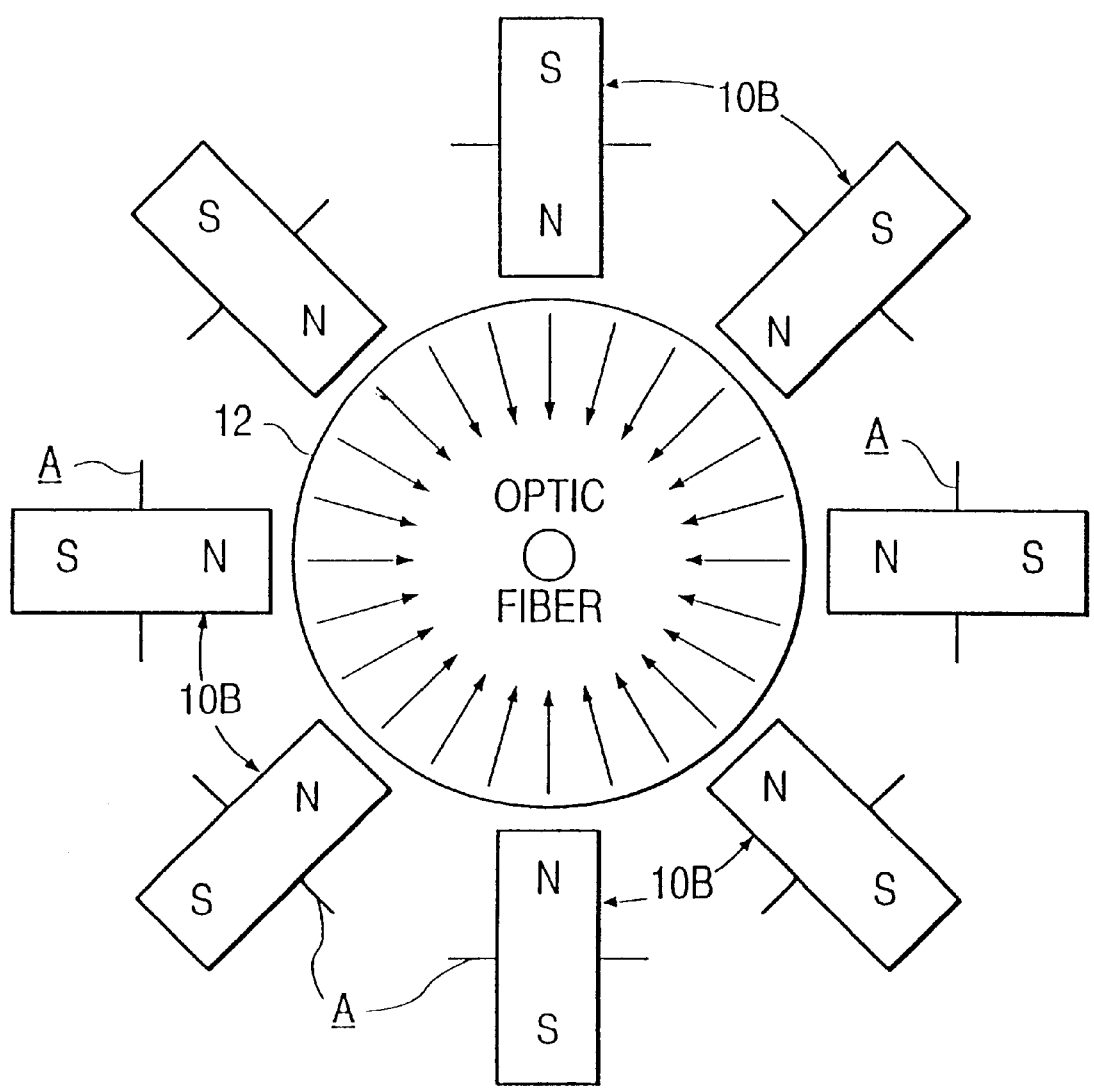
FIG. 3 is a diagrammatic partly sectional elevation view of a third embodiment.

The embodiments shown in FIGS. 1 and 2 are appropriate for magnetizing the strength member or armor of relatively small diameter fiber optic cables. For larger diameter cables, multiple pairs of mirror-image magnets 10B can be employed as shown in FIG. 3, in which a fiber optic cable 12 is shown, diagrammatically, in cross-section. Each magnet of an opposed pair of magnets is rotatable about an axis A that is perpendicular to an axial plane of the cable, and that lies in a plane perpendicular to the longitudinal axis of the cable. The rotation of the magnets is synchronized so that the polarity of the magnetic field applied at all sides of the cable is the same. Of course, the polarity changes as the magnets rotate.

Figure 4:
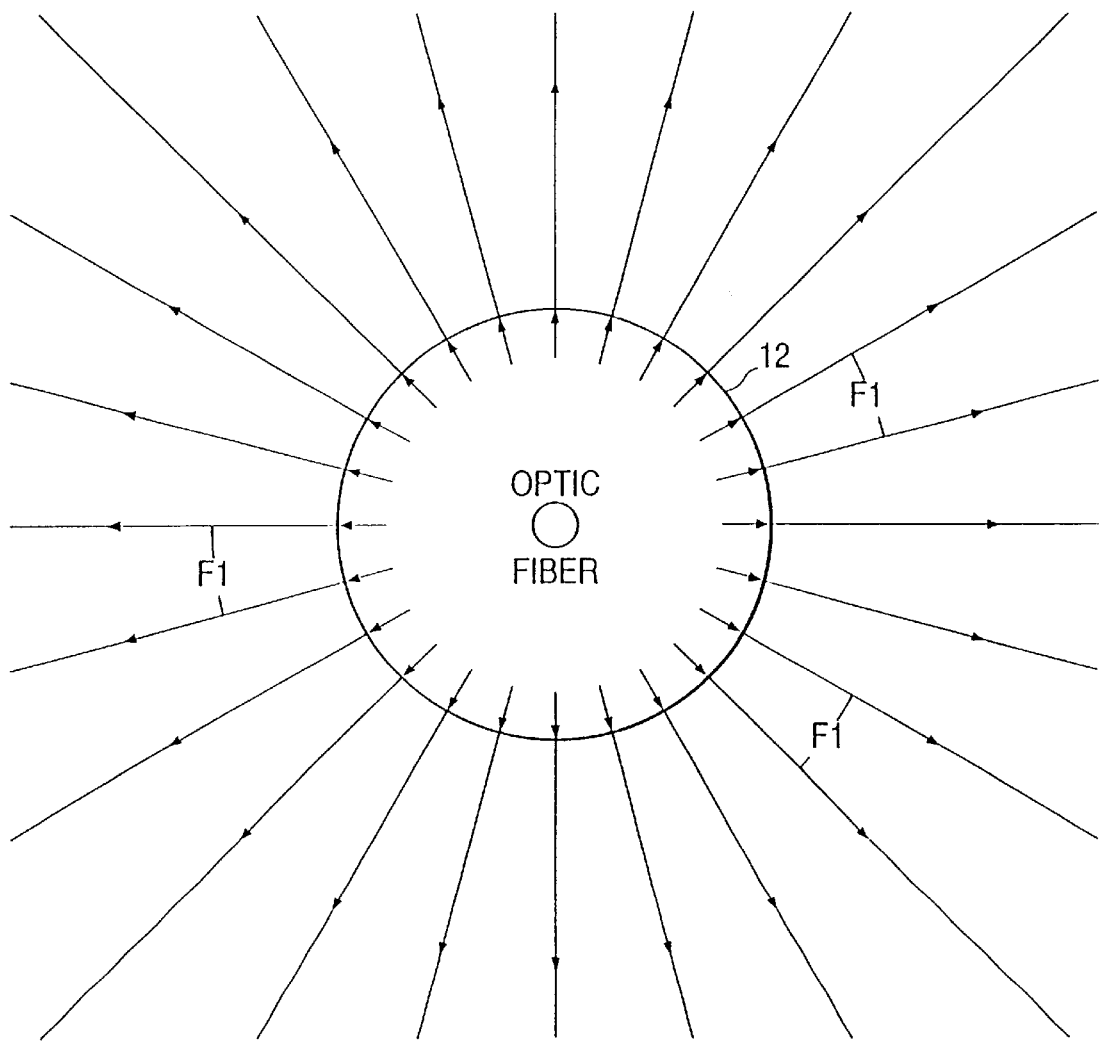
FIG. 4 is a diagrammatic cross-sectional view showing radial flux lines around a fiber optic cable.
Figure 5:
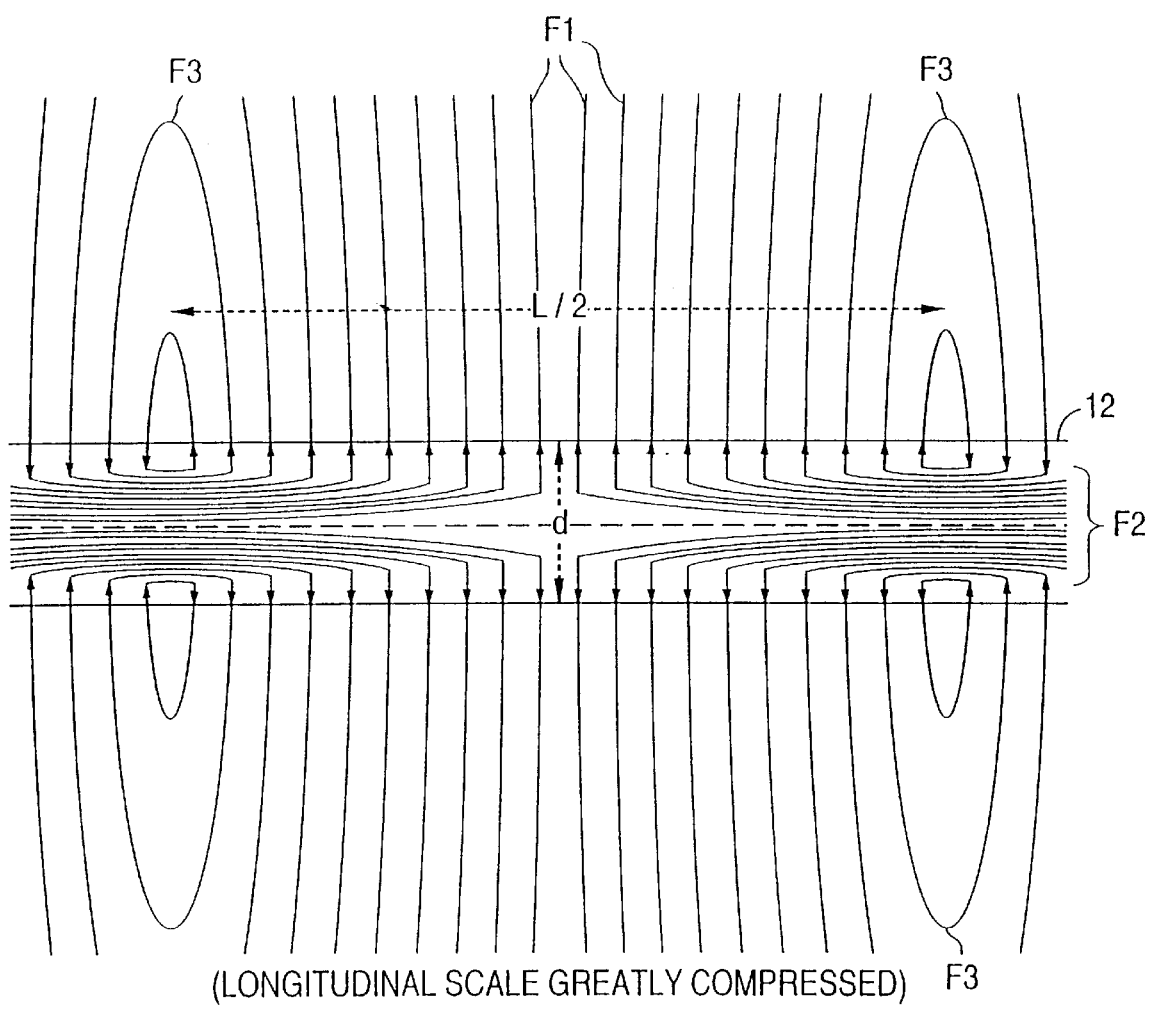
FIG. 5 is a diagrammatic longitudinal sectional view of a fiber optic cable magnetized in accordance with the invention and showing internal axial magnetization and external magnetic flux lines in accordance with a square wave magnetization pattern.
Figure 6:
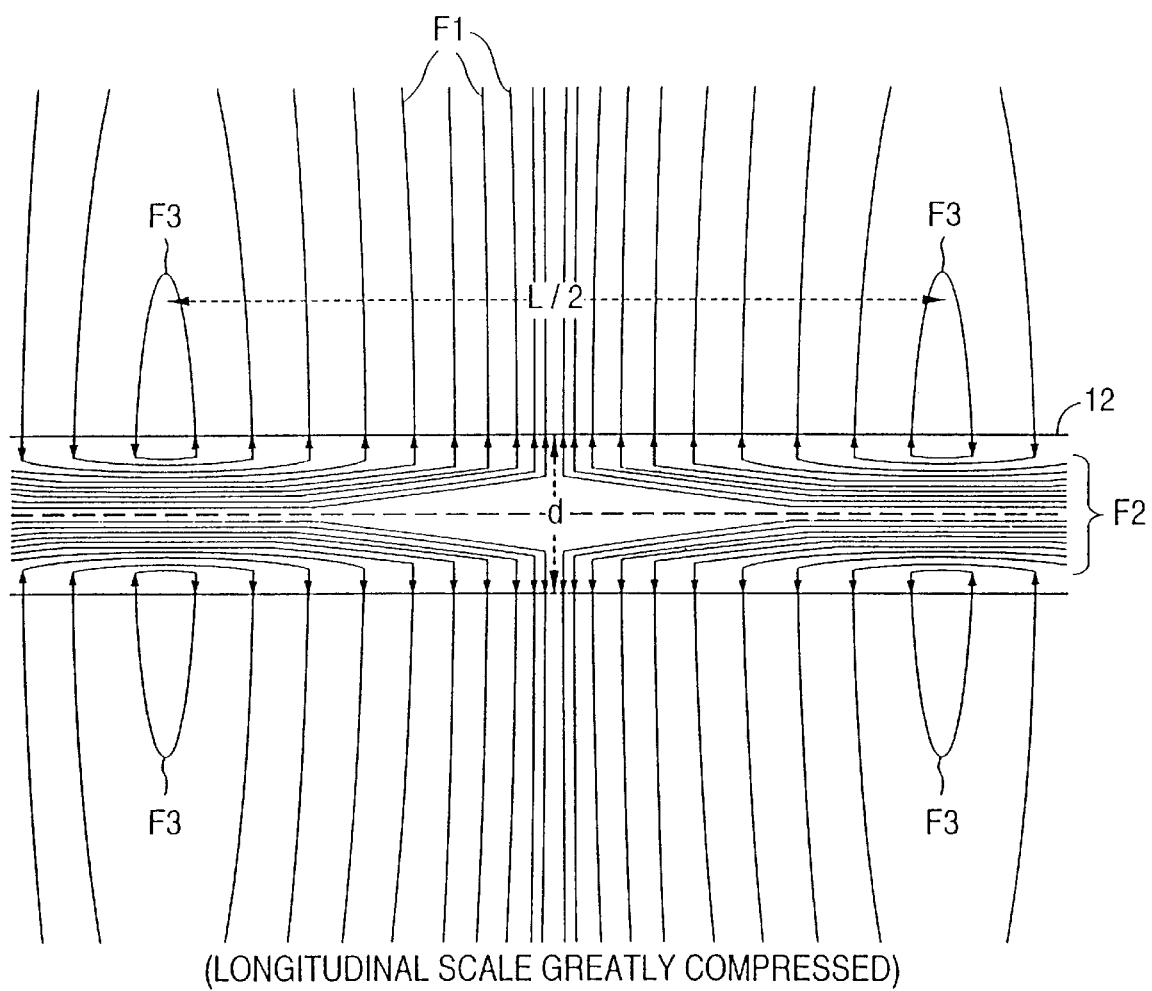
FIG. 6 is a diagrammatic longitudinal sectional view of a fiber optic cable magnetized in accordance with the invention and showing internal axial magnetization and external magnetic flux lines in accordance with a sine wave pattern.

The magnetizers shown in FIGS. 1–3 magnetize the ferromagnetic material of the strength member or armor of the cable such that a cylindrically symmetric radial external field is produced that varies periodically along the length of the cable. As shown in FIGS. 4–6, the cylindrically symmetric external magnetic field has flux lines that extend radially with respect to the cable. The radial flux lines F1 are parts of flux loops having axial parts F2 that extend parallel to the length of the cable, on the surface and/or internally of the cable, and axial parts F3 that extend parallel to the length of the cable externally of the cable.

Along the length of the cable, the external magnetic field includes, repetitively, a region of one polarity followed by a region of the opposite polarity. The alternating regions or zones are of length L/2, where L is the wavelength of the magnetic field variations. In accordance with the invention, it is highly preferred that L be substantially greater than the width or diameter d of the cable perpendicular to its length. In that case, the strength of the external magnetic field decreases approximately linearly with increase in distance from the cable, i.e., there is an inverse relationship between the field strength and the distance from the cable. The relationship may be expressed as 1/R, where R is the distance from the centerline (axis) of the cable perpendicular to the centerline and is small relative to L.

Figure 7:
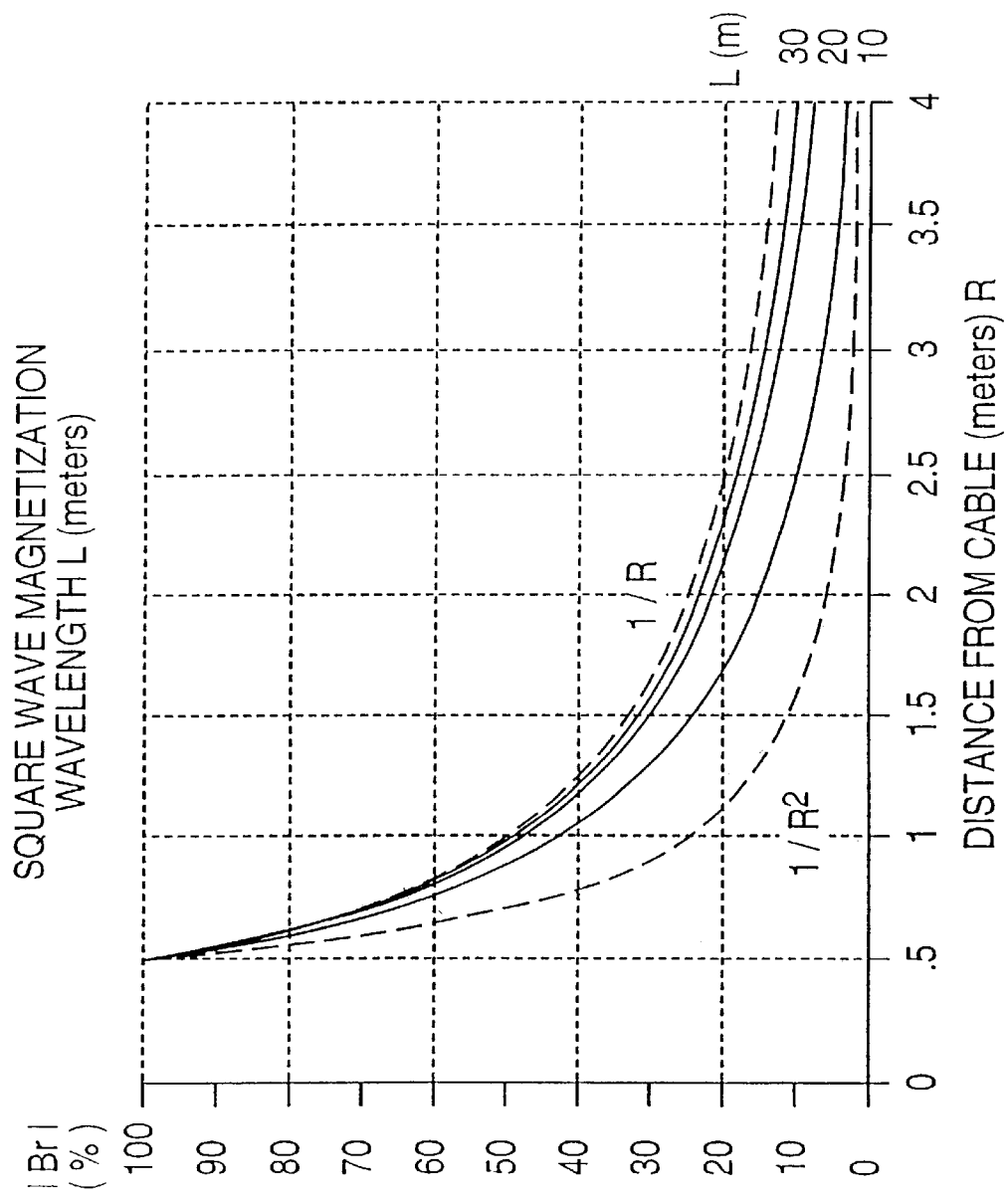
FIG. 7 is a plot of magnetic field radial component magnitude versus radial distance from a cable for various magnetization wavelengths, for square wave magnetization.
Figure 8:
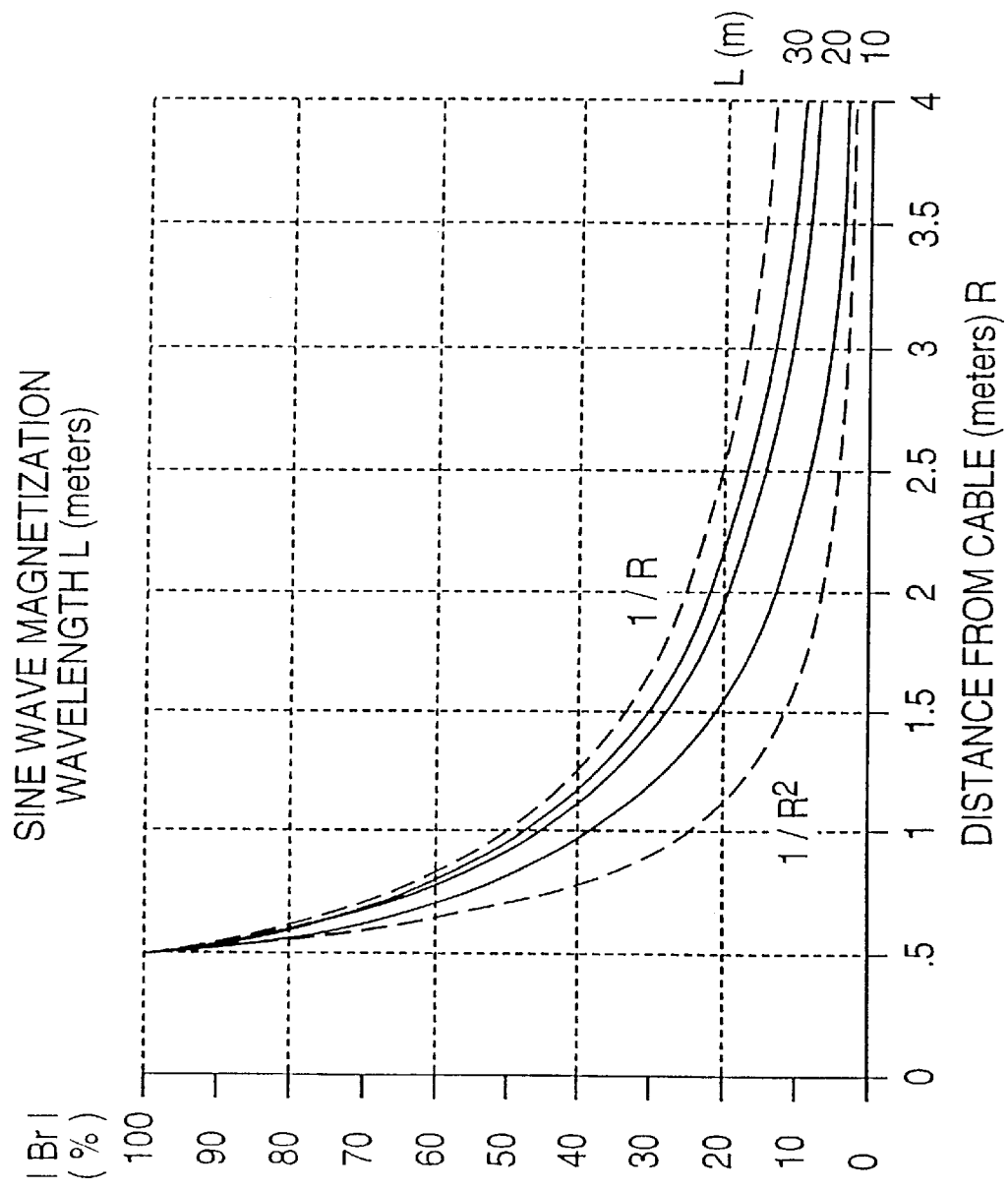
FIG. 8 is a plot of magnetic field radial component magnitude versus radial distance from a cable for various magnetization wavelengths, for sine wave magnetization.

As shown in FIGS. 7 and 8, for the 1/R relationship, the magnetic field radial component magnitude |Br| at distances from the cable that are small relative to wavelength L is substantially greater than that for a $1/R^2$. As shown, the fall-off of the magnitude of the radial external magnetic field with distance R from the center line of the cable is in accordance with $1/R^n$, where n is between 2 and 1 The curves shown in FIGS. 7 and 8 are for wavelengths of 10, 20, 30 meters, but shorter or longer wavelengths may be appropriate. It is apparent that the longer the wavelength L the close the approximation to 1/R.

For any given wavelengths the wave shape may be adjusted from square wave to sinusoidal. However, for any shape other than sinusoidal (e.g., square wave) the variation in radial field strength with distance R away from the cable is not constant along the cable. The radial variation of the radial field component is a function only of wavelength for sinusoidal magnetization, but varies also with position along the cable for non-sinusoidal magnetization Thus, the "best" shape for any wavelength is sinusoidal, which also requires the simplest magnetizer configuration (rotating bar magnets).

Figure 9:
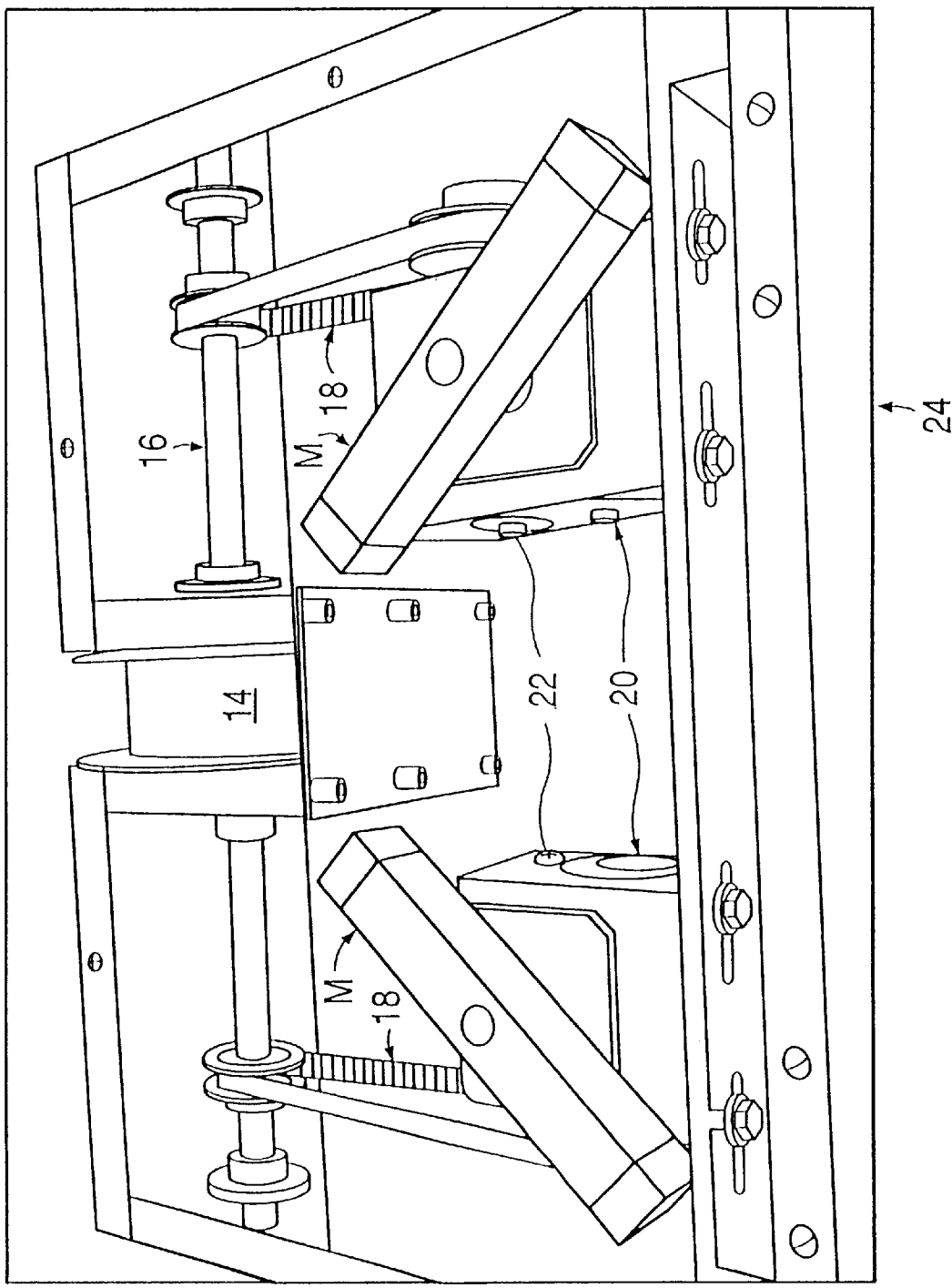
FIG. 9 is a perspective view of an actual magnetizer for small fiber optic cables.

FIG. 9 shows an actual magnetizer for magnetizing small diameter fiber optic cables in accordance with the invention. The drive roller 14 is driven by a cable (not shown) as the cable is moved longitudinally over the drive roller by a conventional tractor drive (not shown). The drive roller is connected to a pair of counter-rotating mirror-image magnets M arranged to be disposed at opposite sides of the cable, by linkages that include drive shafts 16, belt and sprocket couplings 18, and gear boxes 20. In this instance, each magnet M is constituted by a pair of oppositely poled short magnets at the end of a bar of highly permeable magnetic material mounted on a rotational shaft 22. The magnetizer also includes a housing 24 having a cover (not shown) with a guide channel for the cable and a notch for exposing the drive roller.

Figure 10:
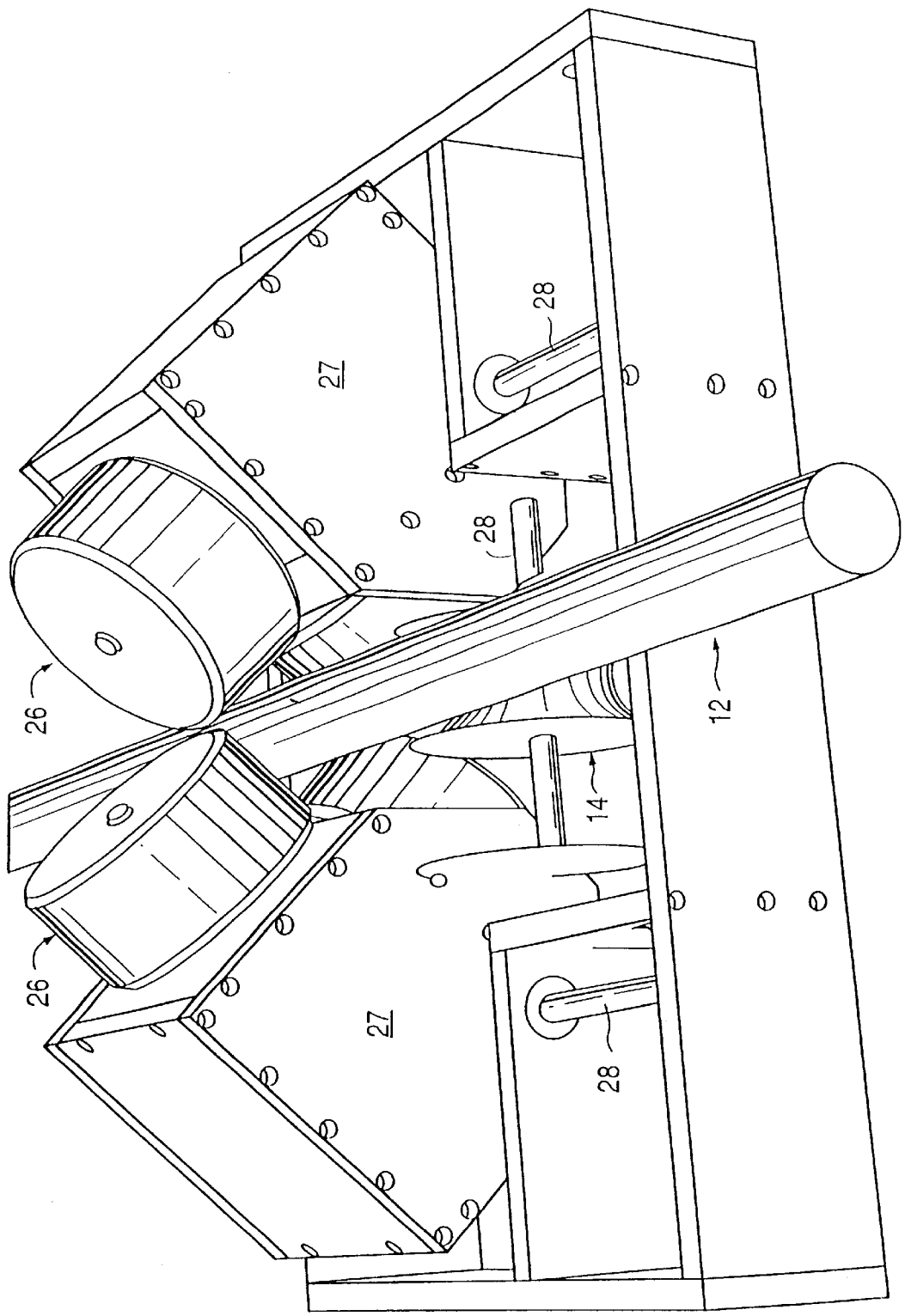
FIG. 10 is a diagrammatic perspective view of a magnetizer for large diameter fiber optic cables.

FIG. 10 shows, diagrammatically, a magnetizer for a large diameter cable, including two pairs of counter-rotating disks 26 carrying mirror-image magnets, the pairs of magnets being arranged around the circumference of a cable 12 that drives a drive roller 14. The drive roller is connected to gear boxes 27, on which the magnet disks are rotatively mounted, by linkages 28 that are shown diagrammatically. These linkages may include belt and sprocket couplings and may also include electrically operated variable ratio gears, clutches and/or brakes in order to vary the pattern of rotation of the disks in response to rotation of the drive roller.

Cable and other elongated objects magnetized in accordance with the invention can be detected, located, and tracked using well-known magnetic detection equipment employing arrays of magnetic sensors such as fluxgate magnetometers or gradiometers. See, for example, the magnetic detection equipment disclosed and claimed in U.S. Pat. No. 4,427,943, incorporated herein by reference.

In actual tests of the invention, on both 51 mm armored cable and 11 mm lightweight unarmored cable, strong external magnetic field signatures were produced, which greatly facilitated accurate horizontal and vertical cable position determination. In both cases, the cables were easily tracked at vertical distances of two meters. The magnetization achieved for the 51 mm armored cable was roughly the same as for a 20-inch diameter steel pipeline, with detection, tracking and depth determination possible at vertical distances approaching 6 meters. The magnetization of the 11 mm unarmored cable was approximately that of a 12-inch diameter pipeline, with detection, tracking and depth determination possible at vertical distances in excess of 4 meters. Both tests involved magnetization that produced a sinusoidal external magnetic field pattern.

Although the magnetizers shown and described employ permanent magnets, electromagnets may also be used. Fixed polarity rotating electromagnets can simply replace the bar magnets. Alternatively, stationary electromagnets can be employed adjacent to a moving cable, and the polarity and strength of the applied magnetic field can be varied electrically. This arrangement can easily be employed to encode data magnetically on the cable, in a digital bar code, for example, which can be read by the magnetic tracking system. Such an arrangement may be used, for example, to mark repeaters or splices along the cable for future location. Similar encoding of data magnetically on the cable can be achieved by varying the rotation of permanent magnets or electromagnets with linear movement of the cable. For example, a microprocessor can be used to control the rotational drive trains via clutches, brakes, and/or variable gear mechanisms. Encoding of data can use wavelength modulation or amplitude modulation, for example, of the applied magnetic field.

Elongated objects having ferromagnetic material can be magnetized (marked) continuously, where continuous tracking is desired, for example, or discontinuously. In discontinuous magnetic marking, discrete, longitudinally-spaced magnetic marks may be applied to wire rope, chain, cable, pipe, or tubing, for example, as event marks, or distance marks for metering out or counting of predetermined lengths of an elongated object. Each discrete region of magnetization, which may be only one wavelength or a few wavelengths long, produces a localized radial external magnetic field that is substantially cylindrically symmetric. With appropriate choice of wavelength, passive magnetic detection can take advantage of the 1/R relationship described earlier. Moreover, it is apparent that the invention is not limited to use with elongated objects that are buried.

While preferred embodiments of the invention have been shown and described, these embodiments are intended to be exemplary, not restrictive, and it will be apparent to those skilled in the art that modifications can be made without departing from the principles and spirit of the invention, the scope of which is set forth in the appended claims.

What is claimed is:

1. An elongated object comprising ferromagnetic material magnetized to provide multiple cycles of longitudinal magnetization that extends along the length of the object and that varies continually throughout each cycle, and that results in multiple cycles of a radial external magnetic field around the object that extends along the length of the object over a plurality of meters, and wherein each cycle of the radial external magnetic field includes a half-cycle in which radial flux lines of one polarity emanate from the object through 360° and another half-cycle in which radial flux lines of opposite polarity emanate from the object through 360°.

2. An elongated object according to claim 1, wherein the cycles of longitudinal magnetization are identical over a plurality of meters and the cycles of radial external magnetic field are identical over a plurality of meters.

3. An elongated object according to claim 1, wherein multiple polarity reversing points of the multiple cycles of radial external magnetic field are spaced along the length of the object to define a wavelength of each cycle of the radial external magnetic field determined so that the fall-off of the magnitude of the radial external magnetic field with distance R from the center line of the object is in accordance with $1/R^n$, where n is between 2 and 1.

4. An elongated object according to claim 1, wherein the radial external magnetic field has a sine wave pattern along the length of the object.

5. An elongated object according to claim 1, wherein the radial external magnetic field has a square wave pattern along the length of the object.

6. An elongated object according to claim 1, wherein the object is a fiber optic cable.

7. An elongated object according to claim 1, wherein the object is a ferromagnetic pipe.

8. An elongated object according to claim 1, wherein the magnitude of the longitudinal magnetization varies progressively throughout each cycle thereof.

9. An elongated object according to claim 1, wherein radial flux lines emanate from the object throughout each cycle of the radial external magnetic field between polarity reversal points.

10. An elongated object according to claim 1, wherein the cycles of radial external magnetic field are of equal length.

11. An elongated object comprising ferromagnetic material magnetized so as to produce multiple cycles of a radial external magnetic field around the object that extends along the length of the object over a plurality of meters and so that the fall-off of the magnitude of the radial eternal field with distance R from the center line of the object is in accordance with $1/R^n$, where R is in a range of several meters and where n is less than 2, irrespective of the radial direction from the object.

12. An elongated object according to claim 1, wherein the radial external magnetic field is substantially cylindrically symmetric.

* * * * *